(12) United States Patent
Morrison

(10) Patent No.: US 11,579,660 B2
(45) Date of Patent: Feb. 14, 2023

(54) SECONDARY COMPONENT SYNCHRONIZED WITH PRIMARY DISPLAY IN AN INFORMATION HANDLING SYSTEM

(71) Applicant: Dell Products L.P., Round Rock, TX (US)

(72) Inventor: Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 17/077,628

(22) Filed: Oct. 22, 2020

(65) Prior Publication Data

US 2022/0129043 A1 Apr. 28, 2022

(51) Int. Cl.
*G06F 1/16* (2006.01)
*F16H 19/04* (2006.01)
*E05D 3/02* (2006.01)

(52) U.S. Cl.
CPC ........... *G06F 1/1681* (2013.01); *F16H 19/04* (2013.01); *G06F 1/165* (2013.01); *E05D 3/02* (2013.01); *E05Y 2201/716* (2013.01); *E05Y 2201/722* (2013.01); *E05Y 2900/606* (2013.01)

(58) Field of Classification Search
CPC .... G06F 1/1616; G06F 1/1633; G06F 1/1647; G06F 1/165; G06F 1/1675; G06F 1/1692
See application file for complete search history.

(56) References Cited

U.S. PATENT DOCUMENTS

| | | | |
|---|---|---|---|
| 10,788,854 B1* | 9/2020 | Liang | G06F 1/1681 |
| 11,079,802 B1* | 8/2021 | Morino | G06F 1/165 |
| 2009/0122015 A1* | 5/2009 | Demuynck | H04M 1/0216 345/169 |
| 2018/0373292 A1* | 12/2018 | Perelli | G06F 1/165 |
| 2019/0196553 A1* | 6/2019 | Lee | G06F 1/1616 |
| 2020/0285273 A1* | 9/2020 | Liang | G06F 1/1649 |
| 2021/0064096 A1* | 3/2021 | Channaiah | G06F 1/1679 |
| 2021/0200269 A1* | 7/2021 | Chen | G06F 1/1662 |

OTHER PUBLICATIONS

Apple, Inc. "How to use the Touch Bar on your MacBook Pro", 2020.
ASUSTeK Computer Inc., "ROG Zephyrus Duo 15", Asus Republic of Gamers (ROG), Apr. 2, 2020.

* cited by examiner

*Primary Examiner* — Anthony Q Edwards
(74) *Attorney, Agent, or Firm* — Norton Rose Fulbright US LLP

(57) ABSTRACT

A secondary display may be integrated into a form factor of an information handling system having a primary display in a manner that synchronizes movement of the secondary display with the primary display. The secondary display may move from a closed position to an open position along with moving of a primary display from a closed to an open position. A rack and pinion mechanism may synchronize the secondary display with the primary display through a first and second primary pinion coupling a primary shaft of the primary display to a rack. A secondary pinion may couple a secondary shaft of the secondary display to the rack. Movement of the secondary display may be synchronized with movement of the primary display through the rack and pinions.

19 Claims, 14 Drawing Sheets

SECONDARY COMPONENT SYNCHRONIZED WITH PRIMARY DISPLAY IN AN INFORMATION HANDLING SYSTEM

FIELD OF THE DISCLOSURE

The instant disclosure relates to information handling systems. More specifically, portions of this disclosure relate to a mechanism for synchronizing a secondary display position with movement of a primary display.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be constructed in a form factor with an integrated display, such as a laptop computer or tablet computer. However, as individuals seek additional ways to process and store information, there is a need to display more information to a user of the information handling system. Some information handling systems may include an additional display. That additional display may allow the user to view and interact with additional information. However, integration of the additional display into the form factor of the information handling system while maintaining user accessibility and portability presents challenges due to the shrinking size of some information handling systems.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

A secondary display may be integrated into a form factor of an information handling system having a primary display in a manner that synchronizes movement of the secondary display with the primary display. In an example form factor of a folding clamshell type device, the primary and secondary displays may rotate around a corresponding primary and secondary hinge point to facilitate the opening and closing of the information handling system. The secondary display may rotate from a closed position to an open position along with rotation of a primary display from a closed to an open position. The closed position of the primary and secondary displays accommodate closing, folding, collapsing, or other change in the information handling system configuration to accommodate transport or storage of the information handling system. The opened position of the primary and secondary displays accommodate operation of the information handling system by a user, such as in a desirable or ergonomic position in which the primary and secondary display are positioned to improve the view from the user's position and/or reduce eye strain. In some embodiments of an information handling system, the primary display and the secondary display may rotate in a synchronous manner from a closed position in which the displays are approximately level with a surface of the information handling system, such as a top surface of a keyboard, to an open position in which the displays are angled towards and facing a user of the information handling system. Synchronizing the movement of the primary and secondary displays improves user experience in operating the information handling system because the user can interact with both displays without separately positioning both displays. Although example clamshell type devices are illustrated, the synchronization of movement of the primary and secondary displays is not limited to such devices.

According to one embodiment, an apparatus may include a rack; a primary shaft; a first primary pinion coupling the primary shaft to the rack; a second primary pinion coupling the primary shaft to the rack; a secondary shaft; and/or a secondary pinion coupling the secondary shaft to the rack. The first primary pinion may include first teeth around a first portion of a circumference (e.g., circumferential portion) of the first primary pinion, and the second primary pinion may include second teeth around a second portion of a circumference of the second primary pinion. In certain embodiments, the first teeth and the second teeth are configured such that neither the first teeth nor the second teeth engage the rack for a first rotational range of the primary shaft; the first teeth may be configured such that the first teeth engage the rack for a second rotational range of the primary shaft; and/or the second teeth are configured such that the second teeth engage the rack for a third rotational range of the primary shaft. The primary shaft and the secondary shaft may be coupled to a primary component and a secondary component, such as a primary display and a second display. However, other components may be coupled to the shafts and rotated in a synchronized manner. Some embodiments may include synchronization features described herein, for synchronizing a keyboard coupled to the secondary shaft with a primary display coupled to the primary shaft. Some embodiments may include synchronization features described herein, for synchronizing a speaker bar coupled to the secondary shaft with a primary display coupled to the primary shaft.

In certain embodiments, the apparatus may include a gear box may include a first input; a first output; and second output, wherein the first output is coupled to the first primary pinion and is configured to rotate the first primary pinion in a first rotational direction, and wherein the second output is coupled to the second primary pinion and is configured to rotate the second primary pinion in a second rotational direction opposite the first rotational direction; and/or a tension spring coupling the first primary pinion to the primary shaft.

According to some embodiments, an apparatus may include a first component, a second component, and means for synchronizing rotation of the second component with rotation of the first component by translating a first force applied to the first component to a second force applied to the second component. One example of the synchronizing means is a rack-and-pinion mechanism according to any of the example embodiments described herein. The synchronizing means may include means for allowing the first component to rotate around a first center of curvature through a first rotational range without moving the second component, means for synchronizing comprises means for rotating the second component around a second center of curvature in a first direction when the first component rotates around the first center of curvature through a second rotational range, and/or means for synchronizing comprises means for rotating the second component around a second center of curvature in a second direction opposite the first direction when the first component rotates around the first center of curvature through a third rotational range. These allowing and rotating means may include teeth arranged around certain circumferential portions of pinions. In certain embodiments, the apparatus may include means for resolving conflict in the synchronizing means, such as a tension spring.

According to some embodiments, a method may include receiving rotational force applied to a first component attached to a primary shaft and synchronizing movement of a second component with movement of the first component by translating the received rotational force to a second rotational force applied to the second component. The synchronizing may include allowing the first component to rotate around a first center of curvature through a first rotational range without moving the second component; rotating the second component around a second center of curvature in a first direction when the first component rotates around the first center of curvature through a second rotational range; and/or rotating the second component around a second center of curvature in a second direction opposite the first direction when the first component rotates around the first center of curvature through a third rotational range. In some embodiments, the receiving of the rotational force includes receiving the rotational force at a primary display of an information handling system, and the synchronizing includes a corresponding movement of a secondary display of an information handling system to the primary display of the information handling system.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
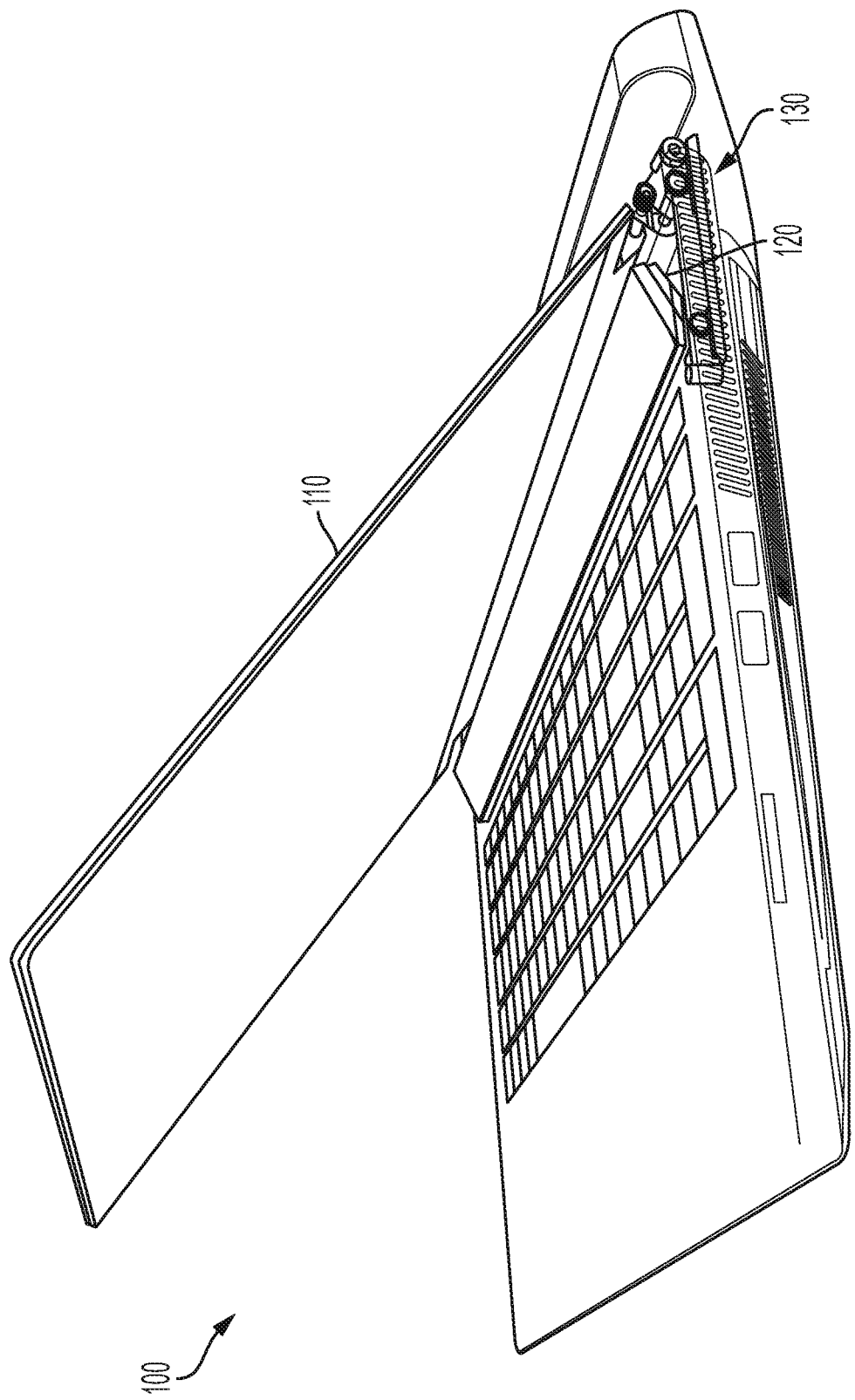
FIG. 1 is a perspective view of a synchronized primary and secondary display for an information handling system according to some embodiments of the disclosure.

One embodiment of an information handling system with primary and secondary displays has a larger primary display that rotates in a first direction to open towards a user and a smaller secondary display that rotates in a second direction opposite the first direction to open towards a user. One example information handling system with a larger primary display and smaller secondary display is shown in FIG. 1. FIG. 1 is a perspective view of a synchronized primary and secondary display for an information handling system according to some embodiments of the disclosure. A portion of an information handling system 100 includes a primary display 110 and a secondary display 120. The primary display 110 and secondary display 120 may use the same or different display technologies, such as one or more of liquid crystal display (LCD), organic light emitting diodes (OLEDs), electronic ink (e-ink or e-paper), or others. The primary display 110 and/or secondary display 120 may include touch sensitivity or stylus capability through a transparent resistive or capacitive matrix or other sensor embedded with or coupled to the primary display 110 and/or secondary display 120. Although certain sizes or shapes are shown in example primary and secondary displays, the displays may take different sizes and shapes to fit different form factors for information handling systems. For example, the secondary display 120 may be sized to fit a touch-screen keyboard along with a display of information, which may result in the primary display 110 and the secondary display 120 being approximately the same size.

A synchronization mechanism 130 may couple the primary display 110 and the secondary display 120 and synchronize movement of the second component with movement of the first component by translating a first force applied to the first component to a second force applied to the second component. In one embodiment, the mechanism 130 may be a rack and pinion device, but other devices may be used including arrangements of gears and actuators coupled together through mechanical connections, electrical connections, or hydraulic connections. The synchronized movement may include, in some examples, synchronized rotation of the primary and secondary displays around a corresponding first hinge and second hinge point.

Figure 2:
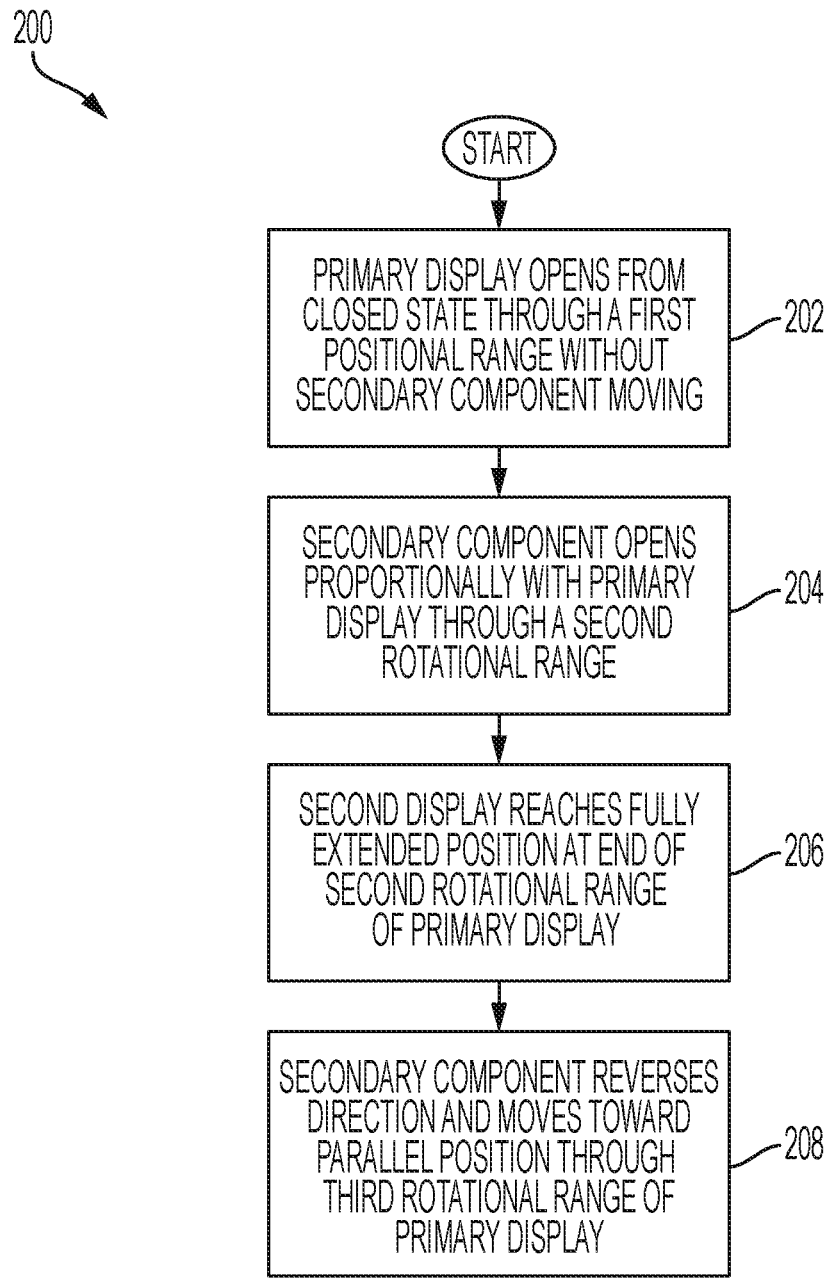
FIG. 2 is a flow chart illustrating a method of operation for synchronizing primary and secondary components of an information handling system according to some embodiments of the disclosure.

One method of operating a primary display and secondary display in a synchronized manner synchronizes the opening and closing of the displays such that the primary and secondary displays open and close together through a plurality of stages. FIG. 2 is a flow chart illustrating a method of operation for synchronizing primary and secondary components of an information handling system according to some embodiments of the disclosure. Although one embodiment is described in FIG. 2 for opening and closing in synchronization, other embodiments may include, for example, opening one component while the other component closes, or vice versa. Further, although some embodiments, such as shown in FIGS. 3A-3G, described herein include two displays, additional displays (e.g., three or more) may be synchronized or other components including a display (e.g., a speaker and a display) or not including a display (e.g., a speaker and a keyboard) may be synchronized. The stages of operation illustrated in the embodiment of FIG. 2 are illustrated in the side views of FIGS. 3A-3G.

Figure 3A:
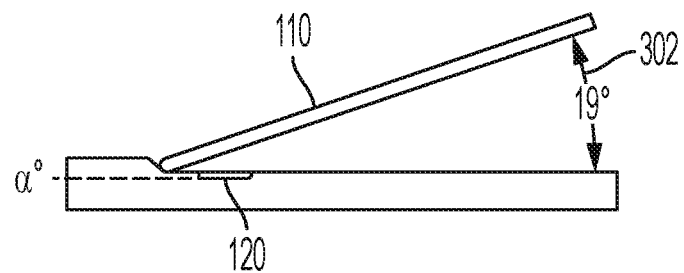
FIGS. 3A-3G are side views illustrating synchronization of primary and secondary displays of an information handling system according to some embodiments of the disclosure.

A method 200 begins at block 202 with a primary display opening from a closed state through a first rotational range of the primary display corresponding to a first stage without the secondary component moving. FIG. 3A illustrates the first stage in which the primary display 110 has been opened a first rotation amount 302 that is within a first rotation range. The secondary display 120 remains in a closed position through the first rotation range, which may be, for example, 0-20 degrees of the primary display 110 relative to a base of the information handling system.

Figure 3B:
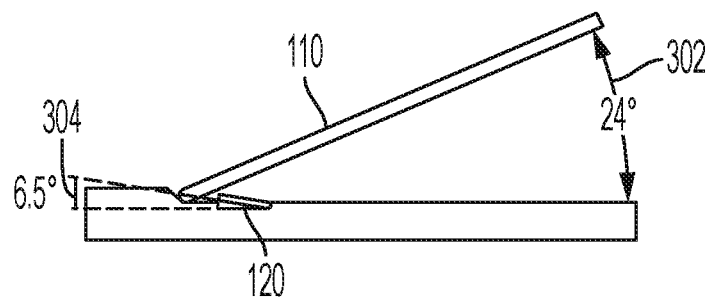
Figure 3C:
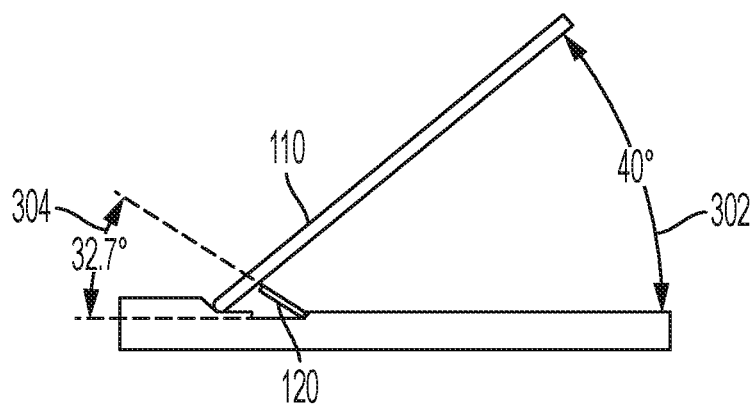

After the primary display is rotated beyond the first rotation range, the secondary component engages and begins to move with the primary display. At block 204, a secondary component opens proportionally with the primary display opening through a second rotational range of the primary display corresponding to a second stage. The secondary display 120 may open initially by rotating in a direction opposite that of the primary display 110. FIG. 3B illustrates the second stage in which the primary display 110 has been opened a second rotation amount 302 that is beyond the first rotation range, but less than a third rotation range. The secondary display 120 begins moving a second rotation amount 304 that is synchronized with the first rotation amount 302 during the second rotational range. FIG. 3C illustrates the primary display 110 opened further through the second rotational range, which may correspond to 20-75 degrees of the primary display 110 relative to a base of the information handling system.

Figure 3D:
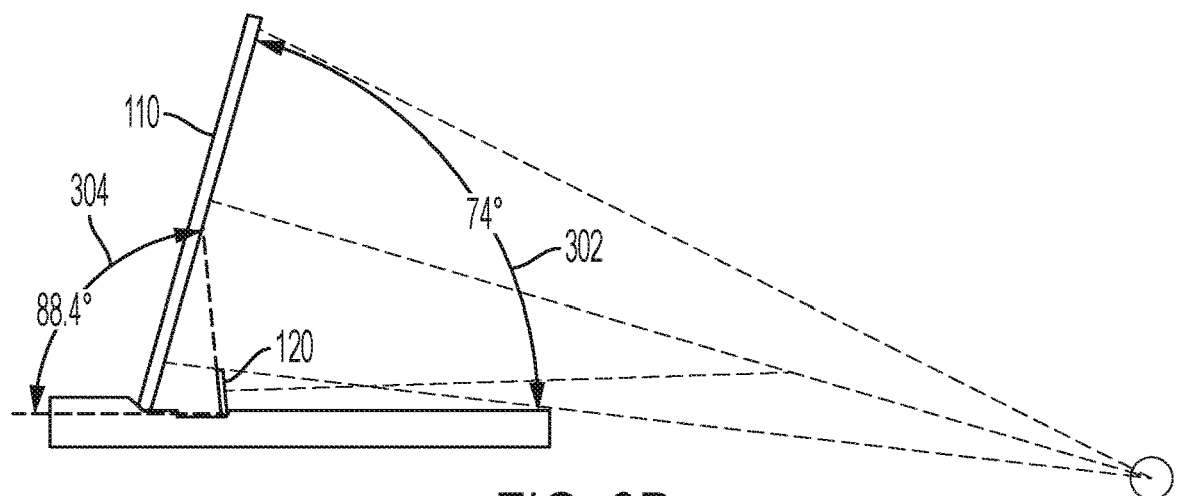

At block 206, the secondary component reaches a fully extended position at an end of the second rotational range of the primary display. At this fully extended position, the secondary component may be at an angle that is not conducive to user viewing, hearing, or physically accessing, but the secondary component may be adjusted to a conducive position for the user through a third rotational range. FIG. 3D illustrates the secondary display 120 fully extended corresponding to the end of the second rotational range of the primary display 110. For example, a fully extended position for the secondary display 120 may correspond to an angle of 90 degrees with respect to a base of the information handling system and be reached at an angle of 75 degrees for the primary display 110.

Figure 3E:
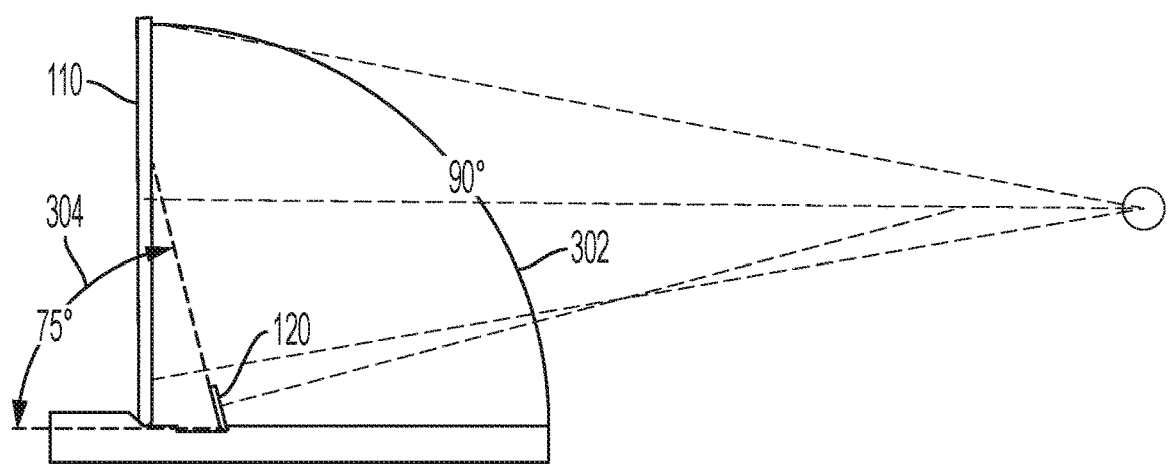
Figure 3F:
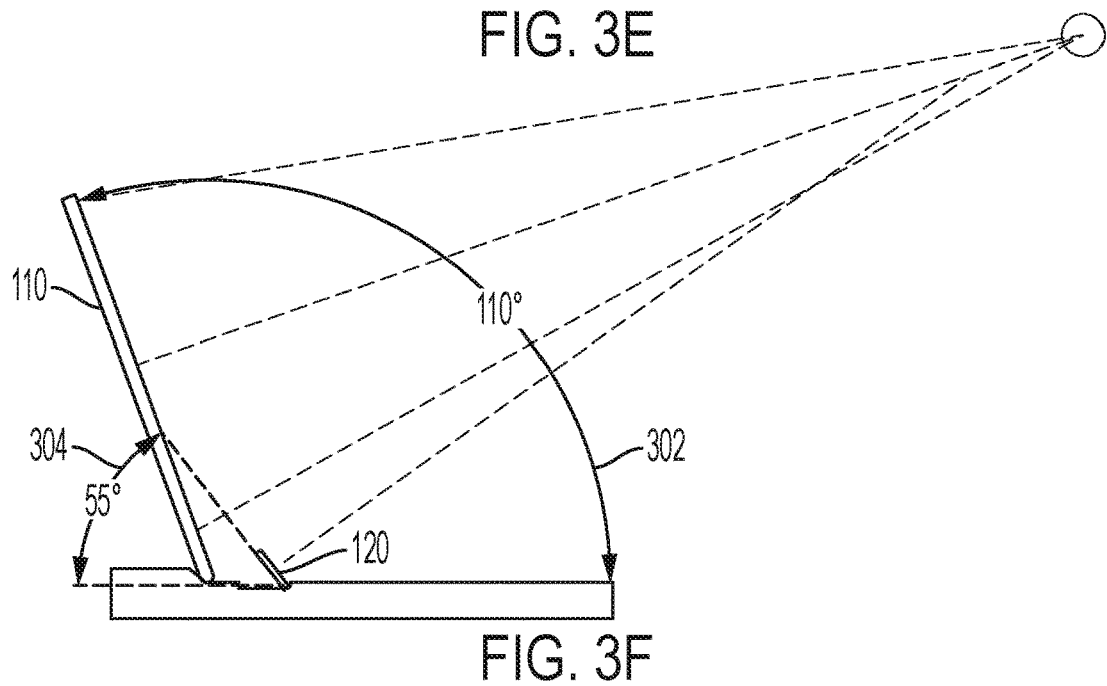
Figure 3G:
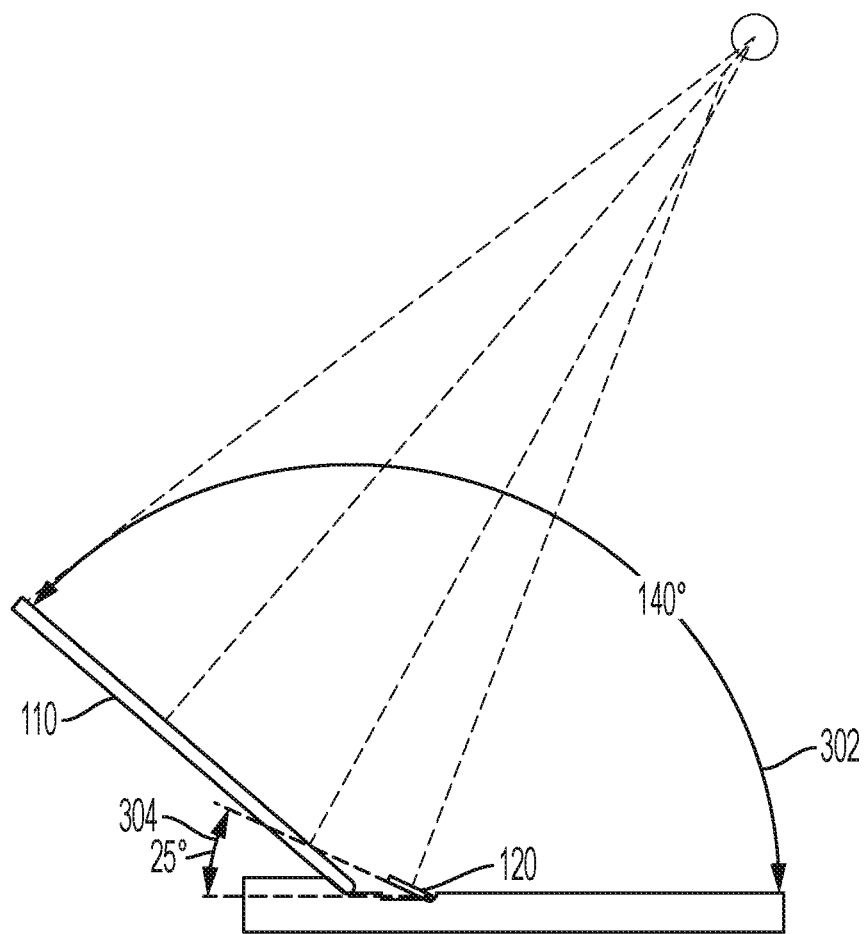

At block 208, the secondary component reverses direction through a third rotational range of the primary display and rotates towards a position that is approximately parallel to the primary display. FIG. 3E illustrates the secondary display 120 rotating in a reverse direction to which the secondary display 120 rotated during the second rotational range of the primary display 110. For example, as the primary display 110 rotates an amount 302 of 110 degrees, the secondary display 120 may rotate back to an amount 304 of 55 degrees. The secondary display 120 may continue to rotate in a synchronized manner with the primary display 110 through the third rotational range to allow a user to obtain a desired viewing angle of both the primary and secondary displays with one motion. FIG. 3G illustrates the secondary display 120 fully extended at an angle 304 of 25 degrees corresponding to an angle 302 of 140 degrees for the primary display 110.

The third rotational range may extend, for example, from 75 degrees to 140 degrees, from 75 degrees to 150 degrees, or from 75 degrees to an angle above 180 degrees. Beyond 180 degrees, the secondary display 120 may be configured through the synchronization mechanism to rest flush with the information handling system. In some embodiments, a fourth rotational range may be used during which the secondary display 120 reaches a final position but the primary display 110 continues to extend without further rotating the secondary display 120. For example, the secondary display 120 may reach an angle of 55 degrees corresponding to the primary display 110 angle of 110 degrees, and the secondary display 120 remains fixed at the 55 degree angle while the primary display 110 extends from 110 degrees to 130 degrees.

Figure 4:
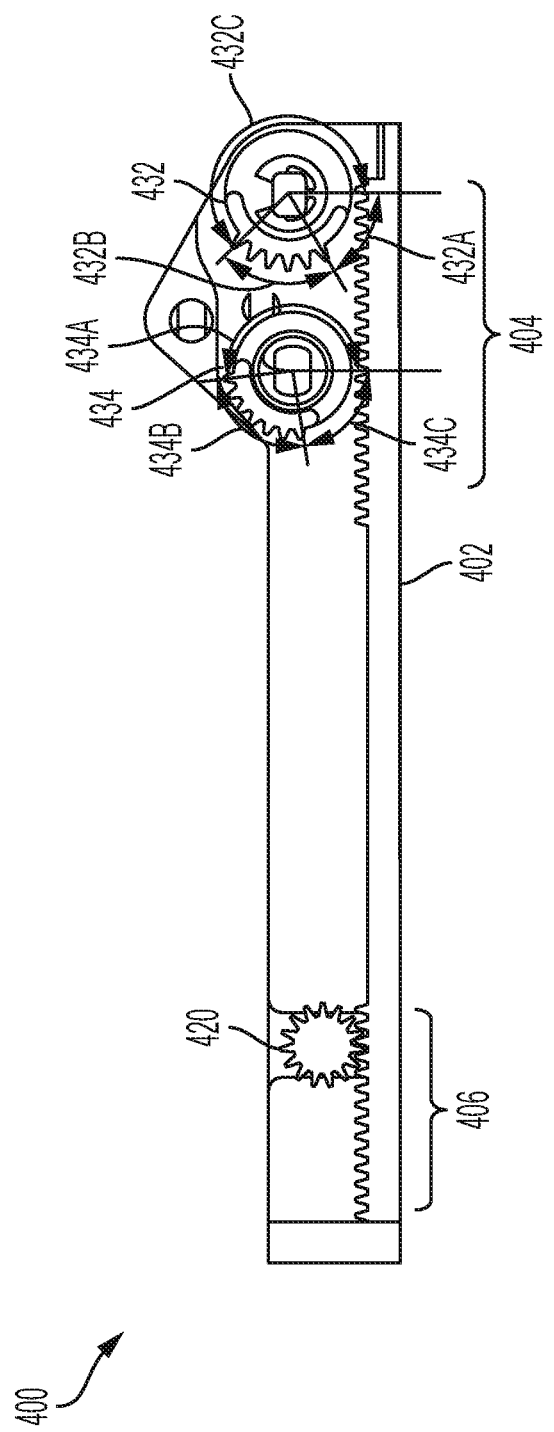
FIG. 4 is a side view illustrating a rack and pinion mechanism for synchronizing primary and secondary displays of an information handling system according to some embodiments of the disclosure.

A rack and pinion mechanism may be used to couple the primary display 110 and the secondary display 120 to obtain the synchronization of the displays or other components described, for example, in FIG. 2. FIG. 4 is a side view illustrating a rack and pinion mechanism for synchronizing primary and secondary displays of an information handling system according to some embodiments of the disclosure. A rack 402 may include a number of teeth arranged in a linear manner. Pinions 420, 432, and 434 may couple to the rack 402 by interconnecting teeth on the pinions 420, 432, and 434 with teeth on the rack 402. Rotation of one pinion is coupled to rotation of other pinions through the rack 402, such that linear movement of the rack 402 results in rotational movement of one or more of the pinions 420, 432, and 434. The pinions 420, 432, and 434 may translate linear motion of the rack 402 to rotational movement of the primary display 110 and secondary display 120 through shafts that couple the pinions 420, 432, and 434 to the displays 110 and 120. A secondary shaft (not shown in FIG. 4, but extending into the page) may couple the secondary pinion 420 to the secondary display 120. A first primary shaft (not shown in FIG. 4, but extending into the page) may couple the first primary pinion 432 to the primary display 110. A second primary shaft (not shown in FIG. 4, but extending into the page) may couple the second primary pinion 434 to the primary display 110.

In some embodiments, one or more of the pinions 420, 432, and 434 may have teeth around only a portion of their circumference to allow staged operation of the synchronization as described in the example stages of FIG. 2. The primary pinions 432 and 434 may have circumferences with three portions 432A, 432B, and 432C, and 434A, 434B, and 434C, respectively, to provide different behavior of the primary and secondary displays during different stages of operation. The pinions 432 and 434 may be coupled to the primary display 110, such as through a gear box, such that the pinions turn in opposite directions with the rotation of the primary display. For example, the pinion 432 may rotate counterclockwise while the pinion 434 may rotate clockwise with opening of the primary display 110. During a first stage, neither of the pinions 432 nor 434 engage the rack 402 because there are no teeth in circumferential portions 432A and 434A. During a second rotational range of the primary display 110, teeth in a second circumferential portion 432B engage the rack 402 while the pinion 434 remains in circumferential portion 434A and uncoupled from the rack 402. The teeth of the second portion 432B cause the rack 402 to move in a linear direction, which rotates the pinion 420 and correspondingly rotates the second display 120. During a third rotational range of the primary display 110, the second pinion 434 engages the rack 402 through teeth in the third circumferential portion 434B to cause the rack 402 to move in an opposite linear direction than when the rack 402 is engaged by pinion 432. In the third rotation range, the first pinion 432 is disconnected from the rack 402 because circumferential portion 432C includes no teeth.

Figure 5:
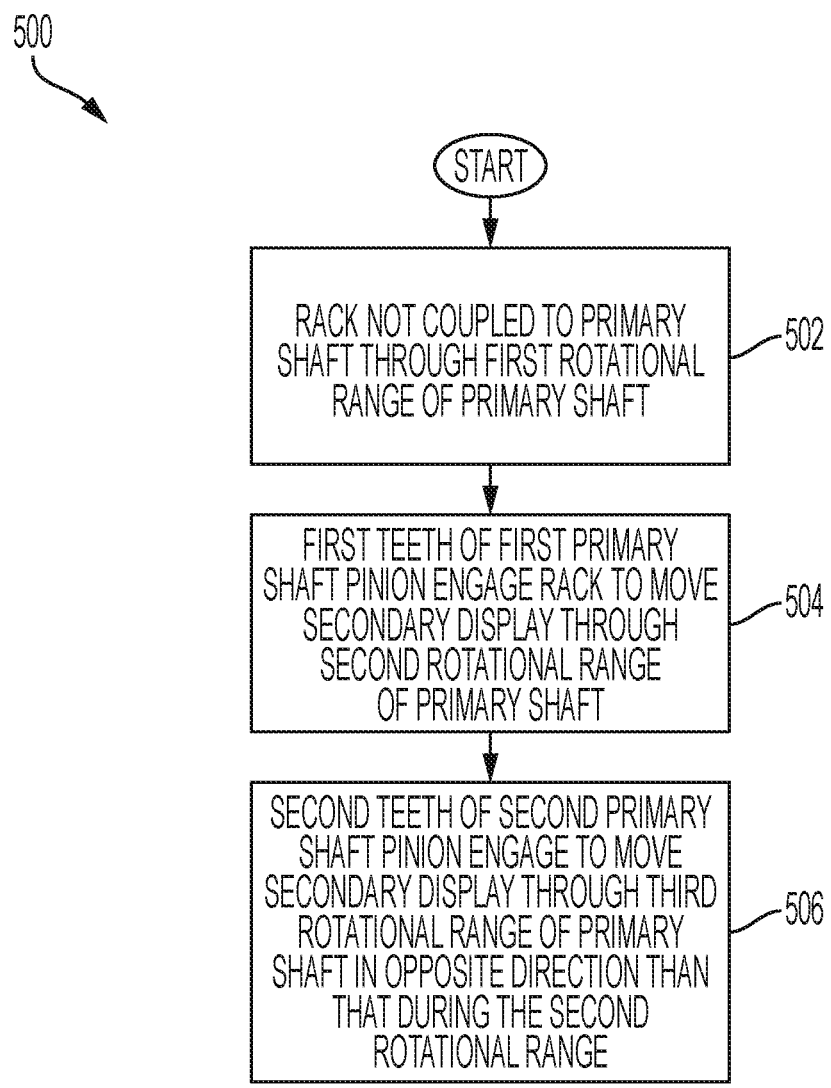
FIG. 5 is a flow chart illustrating synchronizing primary and secondary displays of an information handling system with a rack and pinion mechanism according to some embodiments of the disclosure.

The operation of synchronizing a primary and secondary display with a rack and pinion mechanism such as described in the example embodiment of FIG. 4 is illustrated in FIG. 5. FIG. 5 is a flow chart illustrating synchronizing primary and secondary displays of an information handling system with a rack and pinion mechanism according to some embodiments of the disclosure. A method 500 begins at block 502 with the rack not coupled to the primary shaft through a first rotational range of the primary shaft. Referring to FIG. 4, the first rotational range may correspond to the circumferential portion 432A of first primary pinion 432. There are no teeth in circumferential portion 432A such that the primary shaft coupled to the primary display 110 spins freely without engaging the rack 402, and thus the secondary display does not move. The first rotational range of block 502 also corresponds to a first fraction of the circumferential portion 434A, which has no teeth such that the rack 402 is not engaged through the second primary pinion 434.

After the primary shaft rotates through the first rotational range, the method 500 continues to block 504, at which first teeth of a first primary shaft pinion engage the rack to move the secondary display through a second rotational range of the primary shaft. Referring to FIG. 4, the first primary pinion 432 rotates counterclockwise such that as the second rotational range is entered teeth in the circumferential portion 434B engage the rack 402. In this second rotational range, the second primary pinion 434 rotates clockwise through the circumferential portion 434A having no teeth such that the clockwise motion of second primary pinion 434 does not interfere with the counterclockwise motion of the first primary pinion 432.

At block 506, second teeth of a second primary shaft pinion engage to move the secondary display through a third rotational range of the primary shaft in an opposite direction than during the second rotational range of block 504. Referring to FIG. 4, the second primary pinion 434 spins clockwise such that the circumferential portion 434B engages the rack 402 in the third rotational range of the primary shaft. Teeth in the circumferential portion 434B reverse the direction of the rack 402 such that the secondary display rotates back towards a final position.

The operation of a rack and pinion mechanism, such as the example mechanism of FIG. 4, operating according to the method of FIG. 5 is shown in FIGS. 6A-6G. FIGS. 6A-6G are perspective views illustrating synchronizing primary and secondary displays of an information handling system with a rack and pinion mechanism according to some embodiments of the disclosure.

Figure 6A:
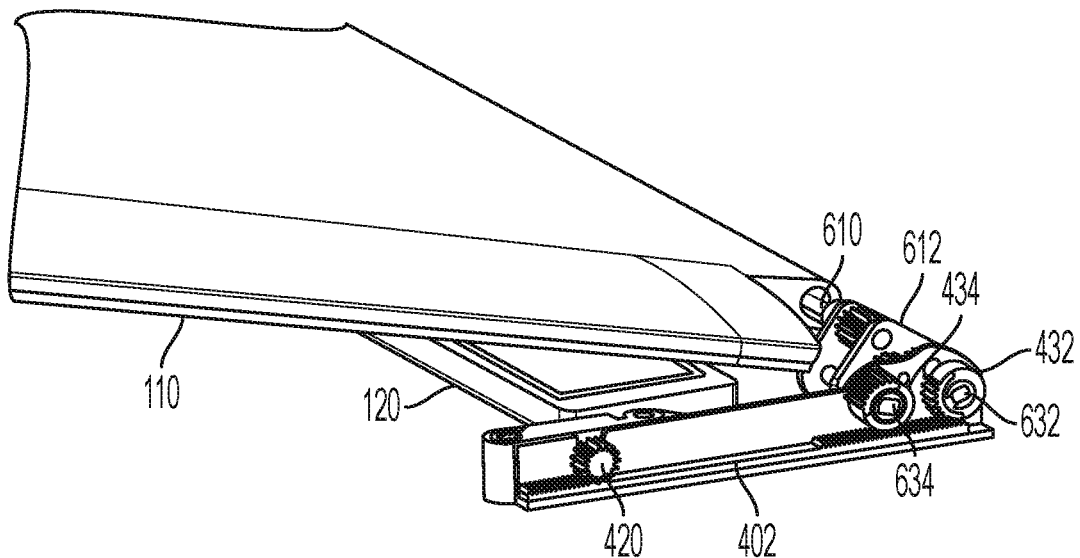
FIGS. 6A-6G are perspective views illustrating synchronizing primary and secondary displays of an information handling system with a rack and pinion mechanism according to some embodiments of the disclosure.

FIG. 6A shows movement of the primary display on the primary shaft 610 through the first rotational range of block 502. The primary display 110 is free to rotate without the primary shaft 610 engaging the rack 402 and without moving the secondary display 120. The first rotational range allows the primary display to begin opening to create space for the secondary display to rotate without the secondary display colliding with the primary display. This buffer may be implemented when the secondary display rotates in a different direction that the primary display. In some embodiments, the rack and pinion mechanism may be configured to rotate the primary and secondary displays in the same direction such as when the closed position for the secondary display faces the secondary display in the same direction as the closed position for the primary display. In such embodiments, a buffer rotational range during which the secondary display does not rotate with the primary display may be omitted.

Figure 6B:
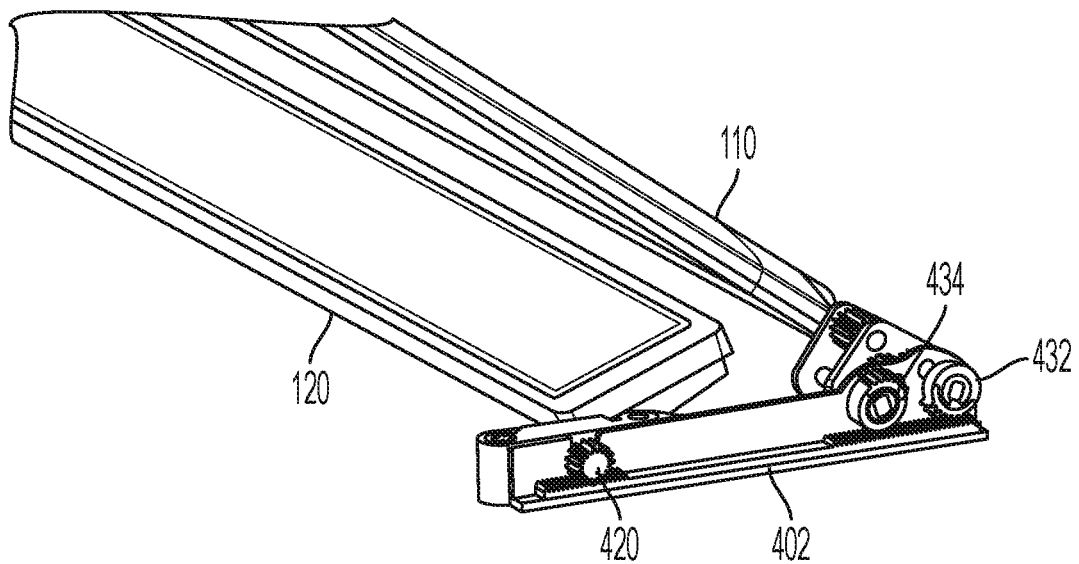
Figure 6C:
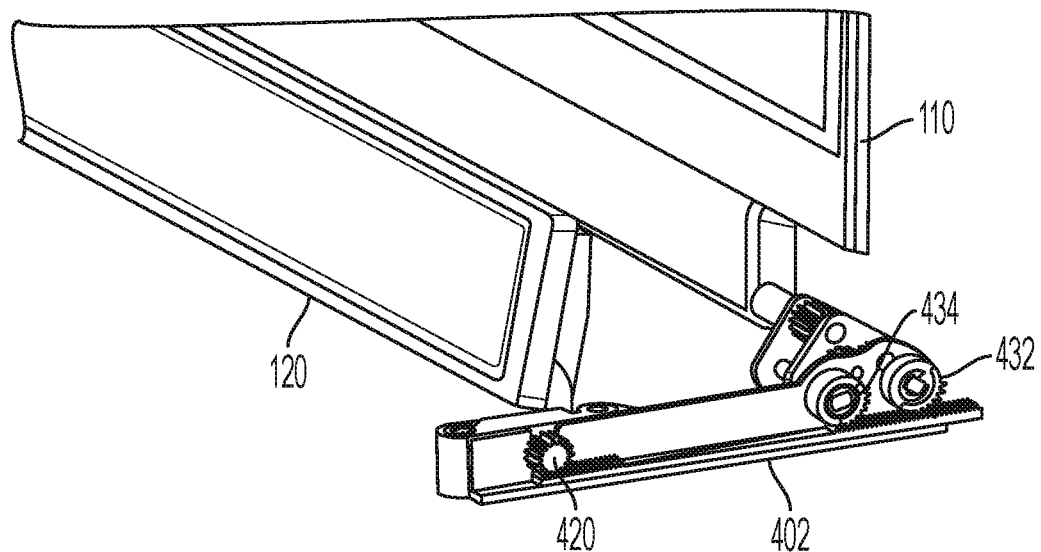

FIG. 6B shows movement of the primary display on the primary shaft through the second rotational range of block 504. In FIG. 6B, teeth of the first primary pinion 432 engage the rack 402 and begin rotating the secondary pinion 420, and consequently the second display 120. The second display 120 continues to open as shown in FIG. 6C towards a fully extended position of the secondary display 120. The fully extended position may correspond to the end of the teeth in the circumferential portion 432B. As the third rotational range is entered, the movement of the rack 402 reverses direction and the secondary display 120 changes rotational direction.

Figure 6D:
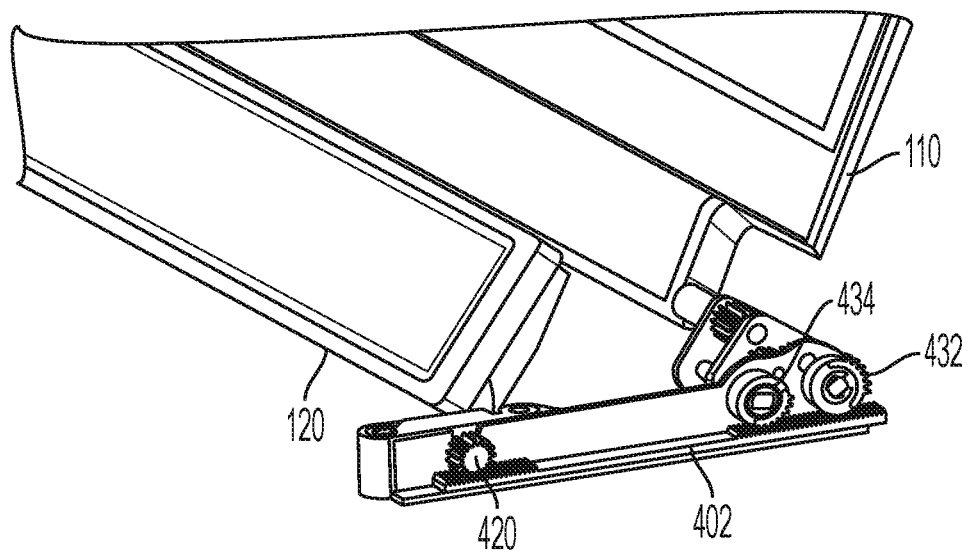

FIG. 6D shows movement of the primary display on the primary shaft through the third rotational range of block 506. In FIG. 6D, teeth of the second primary pinion 434 engage the rack 402 and begin rotating the secondary pinion 420 in a reverse direction, and consequently the second display 120 begins to return to a closed position. In this third rotational range, the secondary display 120 and the primary display 110 may move parallel with each other, such that the secondary display 120 is rotated towards or away from the user as the primary display 110 is rotated towards or away from the user. This third rotational range may correspond to the configuration of an information handling system when the system is open and in use by a user.

Figure 6E:
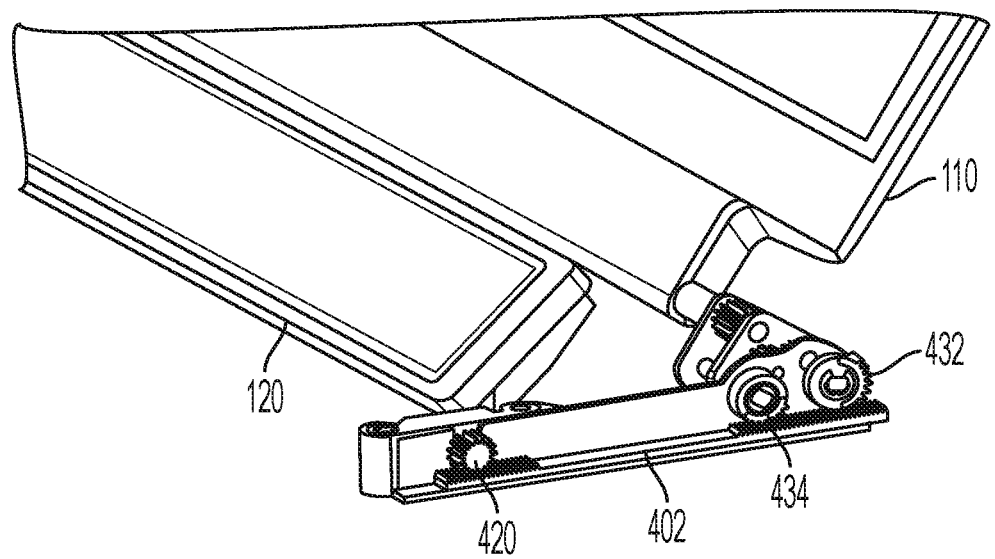
Figure 6F:
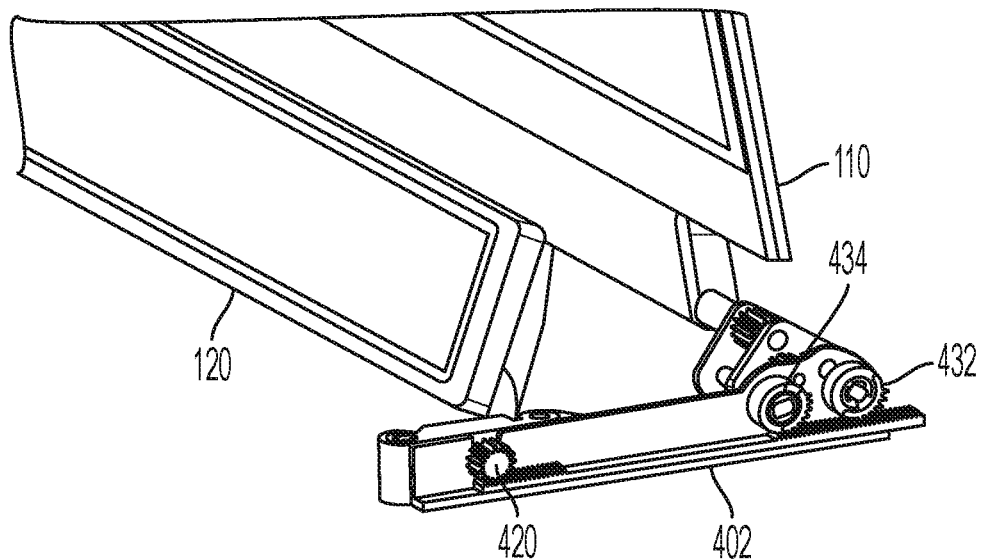
Figure 6G:
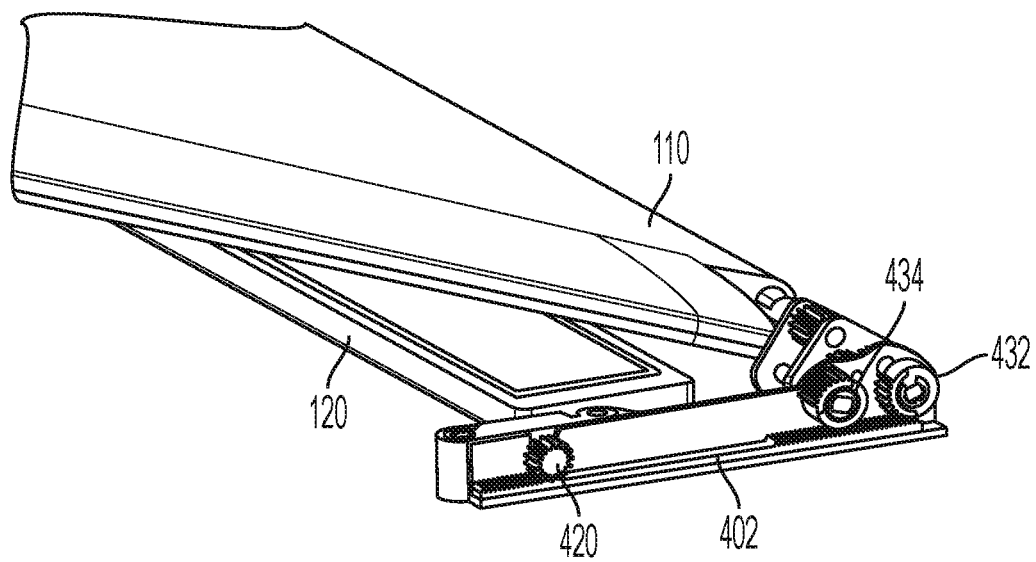

When the information handling system is closed the method 500 reverses as the primary display returns from the third rotational range back into the second rotational range and further into the first rotational range. FIG. 6E illustrates the primary display 110 and the secondary display 120 rotating backward through the third rotational range. FIG. 6F illustrates the primary display 110 and the secondary display 120 rotating backwards through the second rotational range. FIG. 6G illustrates the information handling system returning to a closed configuration through the first rotational range, in which the secondary display 120 has returned to a closed position and the primary display is rotating back through the first rotational range to a closed state.

Figure 7A:
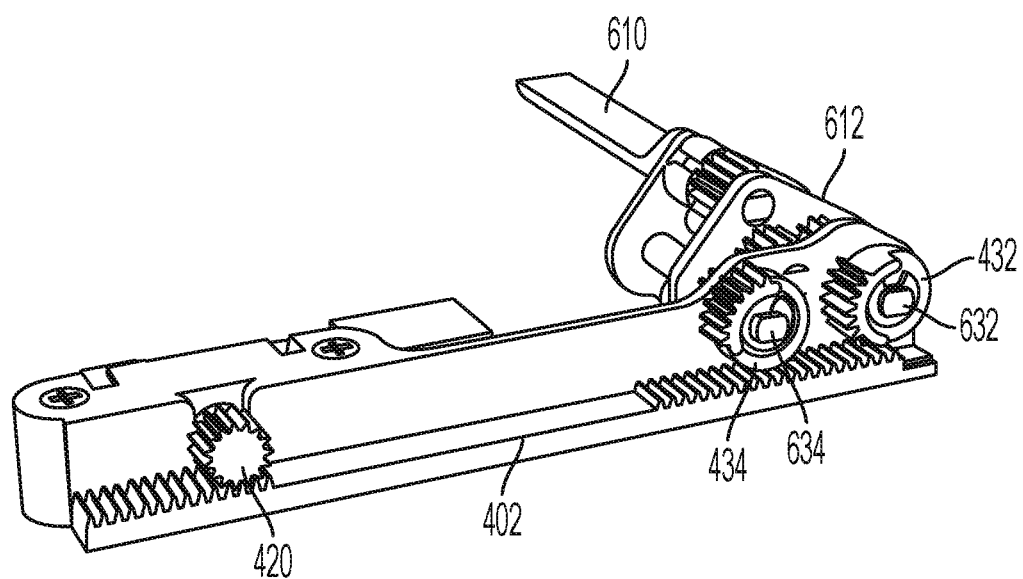
FIGS. 7A-7C are blow out views illustrating a rack and pinion mechanism for synchronizing primary and secondary displays of an information handling system according to some embodiments of the disclosure.
Figure 7B:
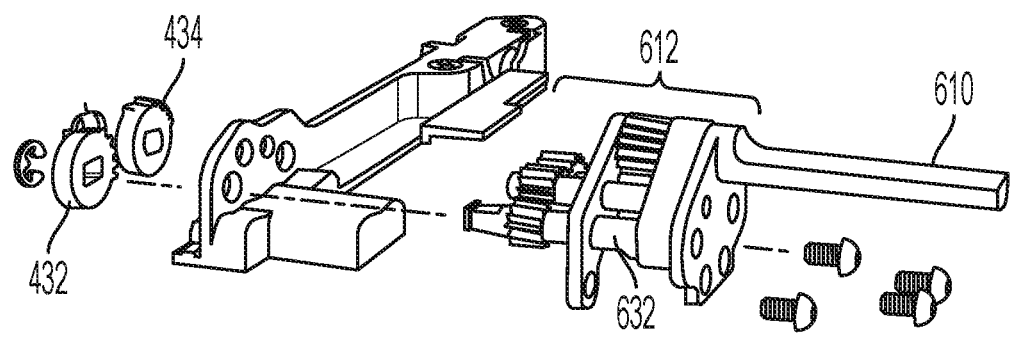
Figure 7C:
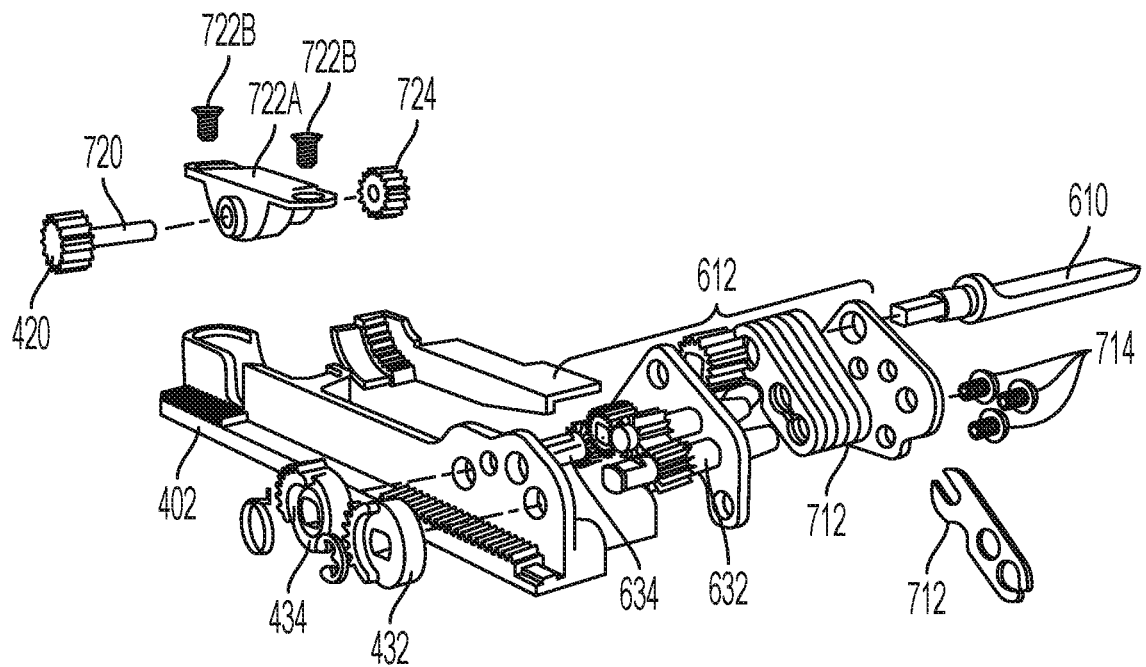

An example implementation of a rack and pinion mechanism, such as the example of FIG. 4, in an information handling system is shown in FIG. 7A-7C. FIGS. 7A-7C are blow-out views illustrating a rack and pinion mechanism for synchronizing primary and secondary displays of an information handling system according to some embodiments of the disclosure. A primary shaft 610 may be coupled to the primary display 110. A gear box 612 may couple the primary shaft 610 to the first primary pinion 432 and the second primary pinion 434 through two shafts 632 and 634, respectively. The gear box 612 may include torque clips 712 and a gear configuration configured to rotate the first primary pinion 432 in a direction opposite the rotation of the primary shaft 610 and configured to rotate the second primary pinion 434 in a direction corresponding to the rotation of the primary shaft 610. In some embodiments, the gears may be configured with different ratios selected to obtain a desired movement of the rack 402 to obtain a desired rotation of the secondary display. In some embodiments, the torque clips 712 may be configured to generate a friction on more than one of the shafts in the gear box 612 to generate sufficient torque to rotate the secondary shaft 720 to reduce the number of clips 712 in the gear box 612 and thus reduce a width of the gear box 612 and hinge on the information handling system.

The secondary display 120 may be rotated by linear movement of the rack 402. A secondary pinion 420 has teeth that engage with the rack 402 to translate linear motion of the rack 402 to rotational motion of secondary shaft 720. The secondary shaft 720 may be attached in an information handling system by a channel 722A that can be attached to an information handling system structure through screws 722A-B. In some embodiments, the secondary display 120 may be indirectly coupled to the secondary shaft 720 and secondary pinion 420 through a secondary gear 724. A ratio of the radius of the gear 724 to the secondary pinion 420 may be selected to obtain a desired rotational range, speed, or other movement for the secondary display 120.

Figure 8:
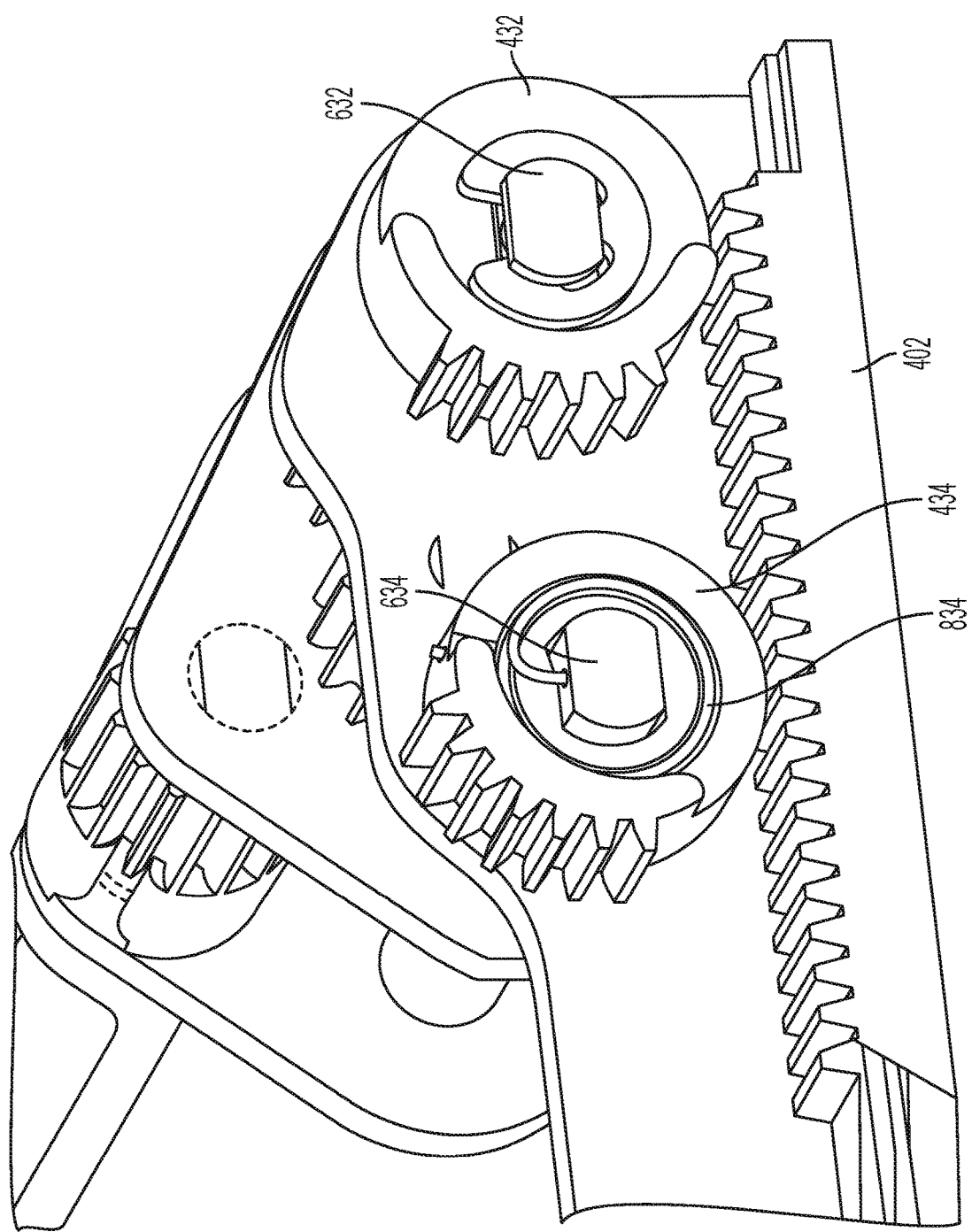
FIG. 8 is a perspective view illustrating a tension mechanism for a rack and pinion mechanism according to some embodiments of the disclosure.

In some embodiments, a coupling device may be used between the primary and/or secondary pinion and the primary shaft. The coupling device may reduce the conflict caused by the application of two opposite forces on the rack 402. For example, if the first and second primary pinions both engage the rack 402, the rack 402 may be prevented from moving because a conflict occurs when each pinion applies an approximately equal and opposite force on the rack 402. A coupling device may be included with the one or more of the pinions to resolve the conflict as shown in FIG. 8. FIG. 8 is a perspective view illustrating a tension mechanism for a rack and pinion mechanism according to some embodiments of the disclosure. A tension spring 834 couples the second primary shaft 634 to the second primary pinion 434. The tension spring 834 absorbs some energy applied by rotational force applied to the second primary pinion 434 by rotation of the primary shaft 610. The tension spring 834 may allow the first primary pinion 432 to continue rotating through its teeth to allow the first primary pinion 432 to disengage from the rack 402 and the second primary pinion 434 to then move the rack 402 in an opposite direction. A coupling device, such as tension spring 834, allows for manufacturing tolerances in the various components of the synchronization mechanism without such tolerances freezing the mechanism and causing failure. Although a tension spring 834 is shown on the second primary pinion, a tension spring may alternatively or additional be included on other pinions, such as the first primary pinion and/or the secondary pinion. In other embodiments, a tension spring may alternatively or additional be coupled between a gear in the gear box 612 and the primary shaft 610.

These example embodiments describe and illustrate various mechanisms for synchronization of a primary display and a secondary display of an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 9:
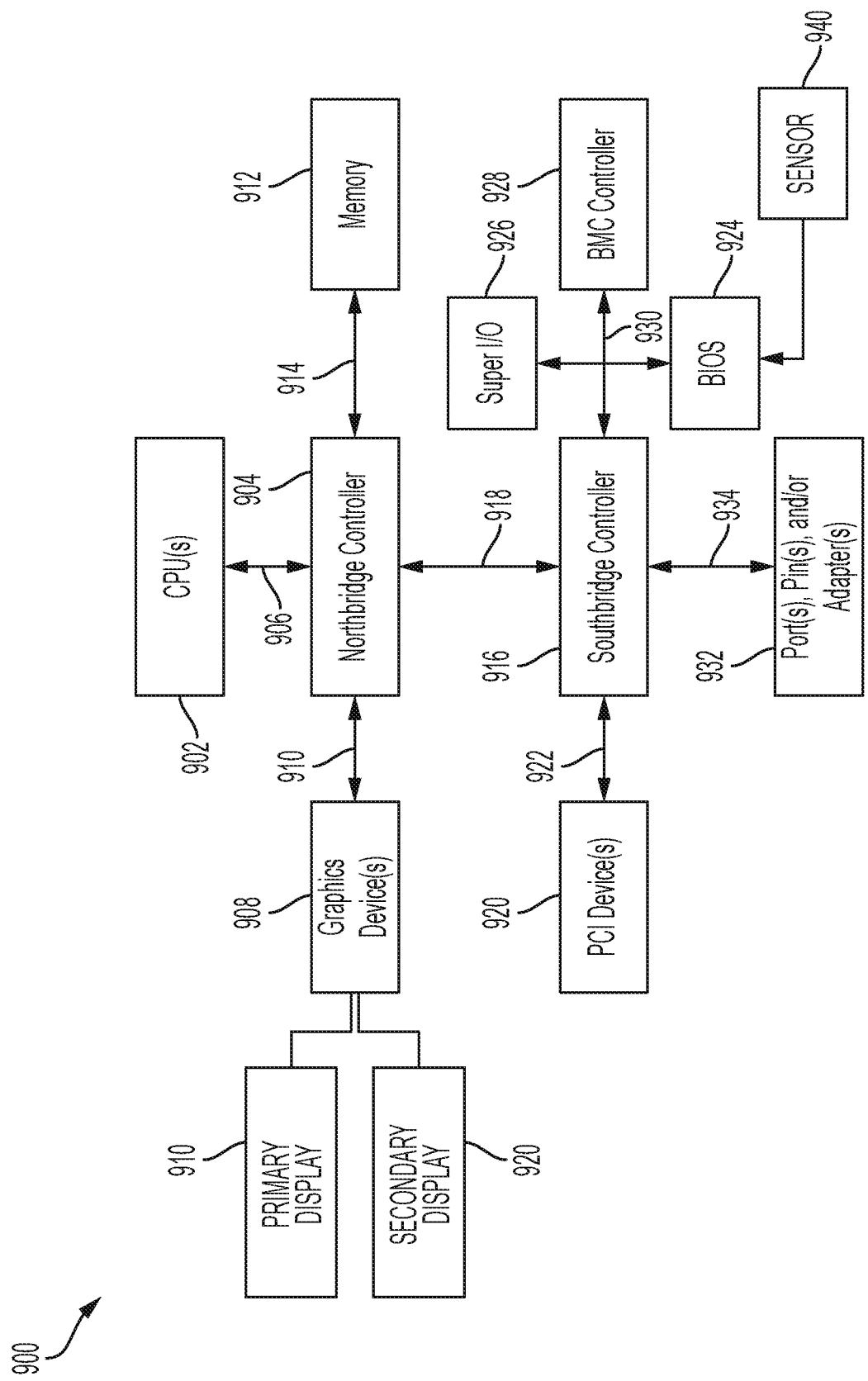
FIG. 9 is a schematic block diagram of an example information handling system according to some embodiments of the disclosure.

An information handling system may include a variety of components to generate, process, display, manipulate, transmit, and receive information. One example of an information handling system 900 is shown in FIG. 9. IHS 900 may include one or more central processing units (CPUs) 902. In some embodiments, IRS 900 may be a single-processor system with a single CPU 902, while in other embodiments IHS 900 may be a multi-processor system including two or more CPUs 902 (e.g., two, four, eight, or any other suitable number). CPU(s) 902 may include any processor capable of executing program instructions. For example, CPU(s) 902 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 902 may commonly, but not necessarily, implement the same ISA.

CPU(s) 902 may be coupled to northbridge controller or chipset 904 via front-side bus 906. The front-side bus 906 may include multiple data links arranged in a set or bus configuration. Northbridge controller 104 may be configured to coordinate I/O traffic between CPU(s) 902 and other components. For example, northbridge controller 904 may be coupled to graphics device(s) 908 (e.g., one or more video cards or adaptors, etc.) via graphics bus 910 (e.g., an Accelerated Graphics Port or AGP bus, a Peripheral Component Interconnect or PCI bus, etc.). The graphics device(s) 908 may drive images to the primary display 110 and the secondary display 120 of information handling system 900.

The displays 110 and 120 may be coupled to the graphics devices 908 through, for example, a flat cable, a flex cable, and/or a ribbon cable. In some embodiments, one or more sensors 940 coupled to the BIOS 124 may be embedded in the synchronization mechanism to monitor the status, such as the rotational angle, of the primary display 110 and/or the secondary display 120, and/or linear motion of the rack 402. The BIOS 924 and/or CPU(s) 902 may respond to changes in status of the mechanism by controlling power to the displays and/or controlling the display of content on the displays 110 and 120. For example, power may not be activated on the secondary display 120 until the second rotational range of the primary display is entered. The BIOS 924 may respond, for example, by turning power on to the secondary display 120 when the secondary display 120 is rotated to a particular angle with respect to the information handling system surface. Northbridge controller 904 may also be coupled to system memory 912 via memory bus 914. Memory 912 may be configured to store program instructions and/or data accessible by CPU(s) 902. In various embodiments, memory 912 may be implemented using any suitable memory technology, such as static RAM (SRAM), synchronous dynamic RAM (SDRAM), nonvolatile/Flash-type memory, or any other type of memory.

Northbridge controller 904 may be coupled to southbridge controller or chipset 916 via internal bus 918. Generally, southbridge controller 916 may be configured to handle various of IHS 900's I/O operations, and it may provide interfaces such as, for instance, Universal Serial Bus (USB), audio, serial, parallel, Ethernet, etc., via port(s), pin(s), and/or adapter(s) 932 over bus 934. For example, southbridge controller 916 may be configured to allow data to be exchanged between IHS 900 and other devices, such as other IHS s attached to a network. In various embodiments, southbridge controller 916 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 916 may also enable connection to one or more keyboards, keypads, touch screens, scanning devices, voice or optical recognition devices, or any other devices suitable for entering or retrieving data. Multiple I/O devices may be present in IHS 900. In some embodiments, I/O devices may be separate from IHS 900 and may interact with IHS 900 through a wired or wireless connection. As shown, southbridge controller 916 may be further coupled to one or more PCI devices 920 (e.g., modems, network cards, sound cards, video cards, etc.) via PCI bus 922. Southbridge controller 916 may also be coupled to Basic I/O System (BIOS) 924, Super I/O Controller 926, and Baseboard Management Controller (BMC) 928 via Low Pin Count (LPC) bus 930.

BIOS 924 may include non-volatile memory having program instructions stored thereon. The instructions stored on the BIOS may be usable CPU(s) 902 to initialize and test other hardware components and/or to load an Operating System (OS) onto IHS 900, for example during a pre-boot stage. For example, BIOS may also refer to a set of instructions, stored on BIOS 924, that are executed by CPU(s) 902. As such, BIOS 924 may include a firmware interface that allows CPU(s) 902 to load and execute certain firmware, as described in more detail below. In some cases, such firmware may include program code that is compatible with the Unified Extensible Firmware Interface (UEFI) specification, although other types of firmware may be used.

BMC controller 928 may include non-volatile memory having program instructions stored thereon that are usable by CPU(s) 902 to enable remote management of IHS 900. For example, BMC controller 928 may enable a user to discover, configure, and manage BMC controller 928, setup configuration options, resolve and administer hardware or software problems, etc. Additionally or alternatively, BMC controller 928 may include one or more firmware volumes, each volume having one or more firmware files used by the BIOS' firmware interface to initialize and test components of IHS 900.

In some embodiments, IHS 900 may be configured to access different types of computer-accessible media separate from memory 912. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 900 via northbridge controller 904 and/or southbridge controller 916. Super I/O Controller 926 combines interfaces for a variety of lower bandwidth or low data rate devices. Those devices may include, for example, floppy disks, parallel ports, keyboard and mouse, temperature sensor and fan speed monitoring, etc.

In some embodiments, northbridge controller 904 may be combined with southbridge controller 916, and/or be at least partially incorporated into CPU(s) 902. In other implementations, one or more of the devices or components shown in FIG. 9 may be absent, or one or more other components may be added. Accordingly, systems and methods described herein may be implemented or executed with other computer system configurations. In some cases, various elements shown in FIG. 9 may be mounted on a motherboard and protected by a chassis or the like.

The schematic flow chart diagrams of FIG. 2 and FIG. 5 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a rack;
   a primary shaft, comprising first teeth around a first portion of a circumference of the first primary pinion;
   a first primary pinion coupling the primary shaft to the rack;
   a second primary pinion coupling the primary shaft to the rack;
   a secondary shaft, comprising second teeth around a second portion of a circumference of the second primary pinion; and
   a secondary pinion coupling the secondary shaft to the rack,
   wherein the first teeth and the second teeth are configured such that neither the first teeth nor the second teeth engage the rack for a first rotational range of the primary shaft.

2. The apparatus of claim 1, wherein the first teeth are configured such that the first teeth engage the rack for a second rotational range of the primary shaft, and wherein the second teeth are configured such that the second teeth engage the rack for a third rotational range of the primary shaft.

3. The apparatus of claim 1, further comprising a gear box comprising a first input; a first output; and second output, wherein the first output is coupled to the first primary pinion and is configured to rotate the first primary pinion in a first rotational direction, and wherein the second output is coupled to the second primary pinion and is configured to rotate the second primary pinion in a second rotational direction opposite the first rotational direction.

4. The apparatus of claim 1, further comprising a tension spring coupling the first primary pinion to the primary shaft.

5. The apparatus of claim 1, further comprising a first component coupled to the primary shaft; and a second component coupled to the secondary shaft.

6. The apparatus of claim 5, wherein the apparatus comprises an information handling system.

7. The apparatus of claim 6, wherein the first component comprises a primary display, and wherein the second component comprises a secondary display.

8. The apparatus of claim 1, wherein a second portion of the circumference of the first primary pinion and a second portion of the circumference of the second primary pinion have no teeth.

9. An apparatus, comprising:
   a first component;
   a second component; and
   means for synchronizing rotation of the second component with rotation of the first component by translating a first force applied to the first component to a second force applied to the second component,
   wherein the means for synchronizing comprises means for allowing the first component to rotate around a first center of curvature through a first rotational range without first teeth of a primary shaft or second teeth of a secondary shaft engaging a rack.

10. The apparatus of claim 9, wherein the means for synchronizing comprises means for allowing the first component to rotate around the first center of curvature through the first rotational range without moving the second component.

11. The apparatus of claim 10, wherein the means for synchronizing comprises means for rotating the second component around a second center of curvature in a first direction when the first component rotates around the first center of curvature through a second rotational range.

12. The apparatus of claim 11, wherein the means for synchronizing comprises means for rotating the second component around a second center of curvature in a second direction opposite the first direction when the first component rotates around the first center of curvature through a third rotational range.

13. The apparatus of claim 9, further comprising means for resolving conflict in the synchronizing means.

14. The apparatus of claim 9, wherein the apparatus comprises an information handling system.

15. The apparatus of claim 9, wherein the first component comprises a primary display, and wherein the second component comprises a secondary display.

16. A method comprising:
   receiving rotational force applied to a first component attached to a primary shaft; and
   synchronizing movement of a second component with movement of the first component by translating the received rotational force to a second rotational force applied to the second component,
   wherein synchronizing the movement of the second component comprises neither first teeth of a primary shaft nor second teeth of a secondary shaft engaging a rack for a first rotational range of the primary shaft.

17. The method of claim 16, wherein synchronizing the movement of the second component comprises allowing the first component to rotate around a first center of curvature through a first rotational range without moving the second component.

18. The method of claim 16, wherein synchronizing the movement of the second component comprises: rotating the second component around a second center of curvature in a first direction when the first component rotates around the first center of curvature through a second rotational range; and rotating the second component around a second center of curvature in a second direction opposite the first direction when the first component rotates around the first center of curvature through a third rotational range.

19. The method of claim 16, wherein the receiving of the rotational force comprises receiving the rotational force at a primary display of an information handling system, and wherein the synchronizing the movement of the second component comprises synchronizing the movement of a secondary display of an information handling system to the primary display of the information handling system.

* * * * *